United States Patent [19]

Strenzke

[11] Patent Number: 5,178,229
[45] Date of Patent: Jan. 12, 1993

[54] CONTROL APPARATUS FOR VEHICLES WITH DIFFERENTIAL SPEED STEERING

[75] Inventor: Hilmar Strenzke, Aschaffenburg, Fed. Rep. of Germany

[73] Assignee: Linde Aktiengesellscaft, Wiesbaden, Fed. Rep. of Germany

[21] Appl. No.: 461,251

[22] Filed: Jan. 5, 1990

Related U.S. Application Data

[63] Continuation of Ser. No. 50,517, May 18, 1987, abandoned.

[30] Foreign Application Priority Data

Sep. 6, 1986 [DE] Fed. Rep. of Germany ....... 3619401

[51] Int. Cl.$^5$ ...................... B62D 11/02; B60K 23/00
[52] U.S. Cl. .................................................. 180/6.48
[58] Field of Search ...................... 180/6.44, 6.2, 6.48; 60/428, 421

[56] References Cited

U.S. PATENT DOCUMENTS

| | | | |
|---|---|---|---|
| 4,175,628 | 11/1979 | Cornell et al. | 180/6.48 |
| 4,399,886 | 8/1983 | Pollman | 180/197 |
| 4,531,601 | 7/1985 | Barbagli | 180/6.48 |
| 4,754,824 | 7/1988 | Olsson | 180/6.48 |

FOREIGN PATENT DOCUMENTS

| | | | |
|---|---|---|---|
| 151207 | 8/1985 | European Pat. Off. | 180/6.48 |
| 151208 | 8/1985 | European Pat. Off. | 180/6.48 |
| 239107 | 9/1987 | European Pat. Off. | |
| 58-145574 | 8/1983 | Japan . | |

Primary Examiner—Mitchell J. Hill
Attorney, Agent, or Firm—Thomas R. Shaffer

[57] ABSTRACT

Straight-forward movement control unit for a vehicle with differential speed steering with a continuously adjustable hydrostatic drive unit on each side of the vehicle, where the output shaft of each of these two drive units is connected with a turning path signal transmitter in which case a valve unit is assigned to each drive unit and it is controlled through a differential speed regulator where the two inlets of a differential path computer are connected to the two outputs of a turning path signal transmitter, and this differential path computer acts through a differential path regulator on the differential speed regulator.

8 Claims, 2 Drawing Sheets

CONTROL APPARATUS FOR VEHICLES WITH DIFFERENTIAL SPEED STEERING

CROSS REFERENCES TO RELATED APPLICATIONS

This application is a continuation of U.S. patent application Ser. No. 050,517, filed May 18, 1987, now abandoned.

BACKGROUND OF THE INVENTION

1. Field of the Invention

This invention relates to control apparatus for vehicles with differential speed steering and particularly control apparatus for track laying vehicles having differential speed steering with a continuously adjustable hydrostatic drive unit on each side of the vehicle with output shafts of both drive units connected with a signal transmitter that detects turning movement and signals a speed regulator whose output is connected to two valving stages, each one connected to one of the drive units through a summing element to which a set point is fed for travel speed by a set point adjuster.

2. Description of the Prior Art

In devices of this type known to date a tacho-generator was connected with each drive unit output shaft. A speed-dependent signal is transmitted from the tacho-generator to a regulator for the differential speed, in which case this regulator compares the two signals and processes them and then sends an output signal to the valve end stages, through which the hydraulic control-pressure valves are influenced, each of which acts on the adjusting device of a hydrostatic drive unit. These devices have the shortcoming that a regulation intervenes only if a differential speed occurs, i.e., different paths are traversed during the same time period, that is, a curve is inadvertently described. Only after a curve segment of varying size is traversed, depending on the inertia of the regulating device, straight-run control, which is to be achieved with the said device, becomes active. Due to the curved or cornering movement, the vehicle is then travelling in an undesirable direction and consequently the direction of travel must be corrected, arbitrarily by the driver.

Vehicle drives with a hydrostatic drive unit without the aforementioned regulator were the basic structures for such vehicles (DE-PS 25 11 176) and corresponding U.S. Pat. No. 4,076,090. Such drives have the disadvantage that it is difficult for the driver and requires continuous steering correction in order to steer the vehicle precisely straight forward. In contrast, an improvement is achieved by the prior art device described above as soon as the regulator for differential speed becomes active. However, this improvement is less than sufficient, since the straight forward behavior in such devices is erratic and must be corrected by the operator as described above.

SUMMARY OF THE INVENTION

The present invention proposes a control with which the vehicle travels straight forward with the greatest possible precision, independently of the various obstacles on both sides of the vehicle, when straight forward travel is imposed.

The present invention is achieved by using path signal transmitters as the signal transmitters, a line is connected to the output of each of these path signal transmitters and to an input of a path computer whose output is, in turn, connected to the input of a path regulator that is operatively connected to the adjusting units of the drive unit.

Due to the fact that the path of the drive wheels is directly detected on both sides of the vehicle, it is possible to detect slight deviations in the paths traversed on both sides of the vehicle from each other and derive the regulating correction from it, in which case it has proven expedient to process it in a form so that it is superposed in the regulator for differential speed. The path traversed on both sides of the vehicle is maintained the same and thus straight forward travel is assured. The path-dependent adjustment of the speed regulation is superposed here, i.e., the previously known speed-regulating device is still present for stabilizing the regulating behavior, but according to the invention it is run by the differential path regulator.

Unequal travel resistances on the two sides of the vehicle or different behaviors of the drive units on the two sides of the vehicle do not adversely affect the straight forward travel behavior. Rather, the vehicle maintains the original direction.

It is particularly advantageous if the turning movement signal transmitter gives a digital signal, e.g., the shaft is connected with an impulse sender disk and the passing of each mark on the impulse sender disk releases an impulse to a sensor. Accordingly, the use of a pair of digital signal transmitters as the path signal transmitters is preferred. Further, such digital transmitters are preferably in the form of impulse transmitter disks with assigned sensors.

The action on the adjusting device of the drive unit in the case of undesirable cornering can occur in various ways, e.g., so that on the inside of the curve that inadvertently occurs as a deviation from the straight forward movement desired the stroke volume of the hydraulic motor is reduced as much as possible and/or the stroke volume of the pump is increased and/or on the outside of this undesirable curve the stroke volume of the pump is reduced and/or the stroke volume of the hydraulic motor is increased in order to effect a curved movement that counteracts the undesirable cornering and effects the desired straight forward movement as the end result.

The present invention provides an improved control for a vehicle to maintain travel of the vehicle in a straight forward direction. The improvement comprises the provision of a path computer, a path regulator, a pair of signal transmitters being path signal transmitters, said path signal transmitters each being connected to an input of said path computer, said path computer having an output connected to an input of said path regulator, and said path regulator having an output operably connected with the adjusting unit of each hydrostatic drive unit whereby said control maintains travel of said vehicle in a straight forward direction when straight forward travel is imposed.

In the foregoing description of my invention I have set out certain objects, purposes and advantages of this invention. Other objects, purposes and advantages of the invention will be apparent from a consideration of the following description and the accompanying drawings in which:

DETAILED DESCRIPTION OF THE PREFERRED EMBODIMENTS

Figure 1:
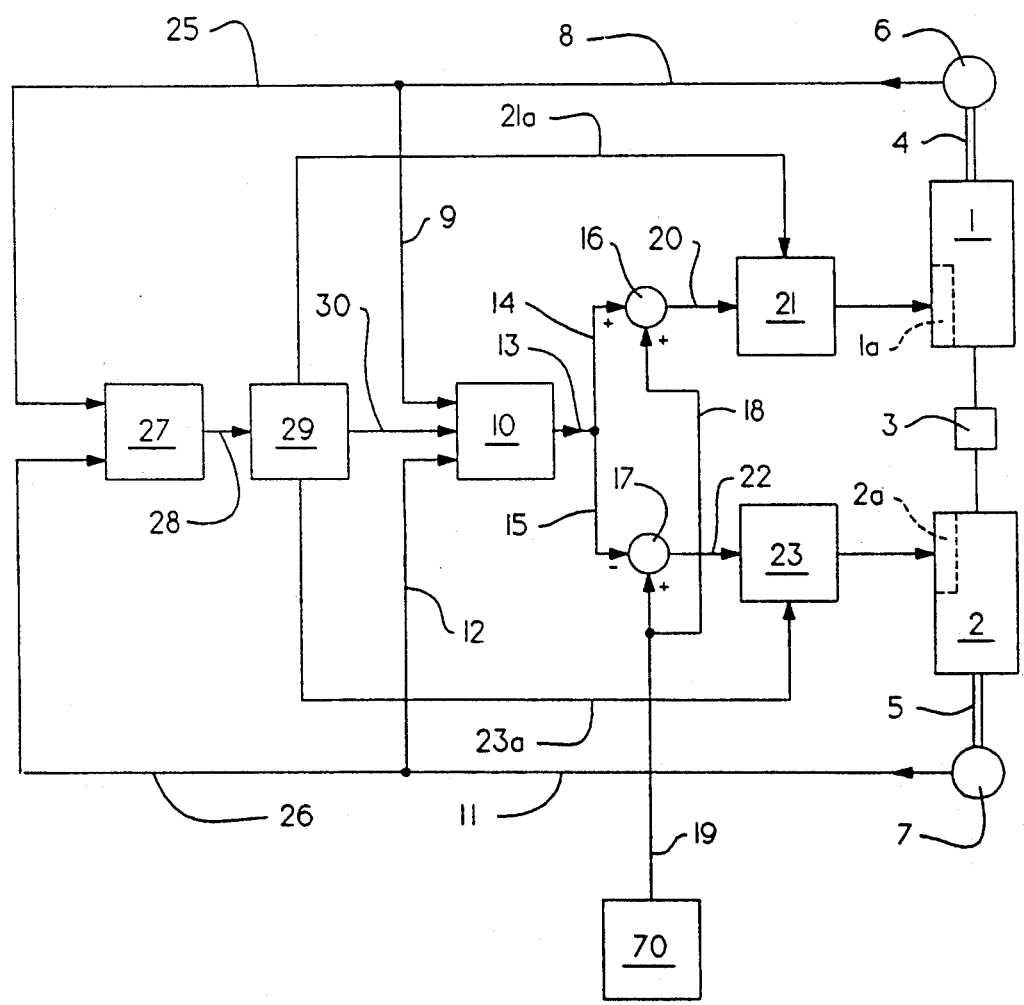
FIG. 1 shows a circuit diagram with a differential path computer and differential path regulator common to both drive units.

As shown is FIG. 1, the hydrostatic drive unit 1 of the left side of the vehicle and the hydrosatic drive unit 2 of the right side of the vehicle are both driven by the same internal combustion engine 3. Hydrostatic drive units 1 and 2 are continuously adjustable and include adjusting elements 1a and 2a, respectively. The output shaft 4 of the hydrostatic drive unit 1 is connected with the tumbler of the chain drive of the left-hand side of the vehicle (not shown in the drawing). In the same manner, the output shaft 5 of the drive unit 2 is connected with the tumbler (not shown in the drawing) of the chain drive of the right-hand side of the vehicle.

Furthermore, the drive unit output shaft 4 is connected with a turning movement impulse sender 6 and the drive unit output shaft 5 is connected with a turning movement impulse sender 7.

From the turning movement impulse sender 6, a line 8, 9 leads to an inlet of a common differential speed regulator 10. In the same manner a line 11, 12 leads to a second inlet of a differential speed regulator 10. A line 13, 14 is connected to its outlet and a line 13, 15, in which case the lines 14 and 15 always carry signals of different polarity. The line 14 leads to a summing element 16 and the line 15 leads to a summing element 17. A line 18, 19 is connected to the second inlet of these summing elements 16 and 17; it leads to a set-point adjuster (70) for the travel speed. A line 20 leads from the summing element 16 to the valve end stage 21 that acts on the hydrostatic drive unit 1, and a line 22 leads from the summing element 17 to the valve end stage 23, which acts on the hydrostatic drive unit 2.

Thus far, the device described corresponds to the known state of the art. If the turning movement impulse senders 6 and 7 emit different speed signals, these different signals act through the lines 8, 9 on the one hand and 11, 12 on the other on the differential speed regulator 10. Due to the regulator dynamics, a speed difference must be in effect for a certain period of time before it is regulated out. During this period the vehicle negotiates an undesired curve. Only then is the straight forward travel that is desired achieved.

In order to eliminate this shortcoming, a line 25 is connected to the line 8, 9 and a line 26 is connected to the line 11, 12, and these two lines lead to the two inlets of a differential path computer 27, whose output signal is carried through a line 28 to the differential path regulator 29, which acts through a line 30 on an additional inlet of the differential speed regulator 10, where the signals are superposed in the latter so that a regulating intervention occurs immediately with the onset of a differently traversed path.

In order to achieve a desired cornering, the lines 14 and 15 are both separated and the lines 18 and 19 are separated from each other and impart different signals corresponding to the desired cornering to the lines 18 and 19 or in another embodiment the end stages 21 and 23 are immediately acted upon arbitrarily in an overiding manner, in which case the regulating action of the elements 27, 29, 10 is switched out, for example, by forcing the initial value of zero on the path regulator 29 and/or the speed regulator 10 with known devices which are not shown because the invention here is not in turning but in controlling straight forward travel.

From the foregoing, it can be seen that the present invention provides an improved control for a vehicle to maintain travel of the vehicle in a straight forward direction. The present invention provides, in a control for a vehicle, such as a track-laying vehicle, with differential speed steering having a pair of continuously adjustable, hydrostatic drive units 1 and 2, one hydrostatic drive unit on each side of the vehicle, each of said pair of hydrostatic drive units including a hydrostatic drive, an output shaft 4 and 5 and an adjusting unit 1a and 1b for said hydrostatic drive, a primary energy source 3 driving each of said hydrostatic drive units 1 and 2, a pair of signal transmitters 6 and 7, the output shaft 4 of the hydrostatic drive of one 1 of said pair of hydrostatic drive units is connected with one 6 of said pair of signal transmitters to detect rotational turning movement of said shaft 4 of the hydrostatic drive of said one drive unit 1 and the output shaft 5 of the hydrostatic drive of another 2 of said pair of hydrostatic drive units is connected with another 7 of said pair of signal transmitters to detect rotational turning movement of said shaft 5 of the hydrostatic drive of said another hydrostatic drive unit 2. A common differential speed regulator 10 is connected to an output of each of said pair of signal transmitters 6 and 7 by lines 8, 9 10 and 11. A pair of valve units 21 and 23 are connected with the output of said speed regulator 10 through a pair of summing elements 16 and 17 by lines 13, 14, 15, 20 and 22, said summing elements 16 and 17 each operably connected to a set point adjuster 70. One 21 of said pair of valve units operably connected to said one 1 of said pair of drive units thereby allowing adjustment of the speed of said one 1 of said pair of drive units and another 23 of said pair of valve units connected to said another 2 of said pair of drive units thereby allowing adjustment of the speed of another 2 of said pair of drive units. The improvement comprises the provision of a path computer 27, a path regulator 29, a pair of signal transmitters 6 being path signal transmitters, said path signal transmitters 6 each being connected to an input of said path computer 27 by lines 25 and 26, said path computer 27 having an output connected to an input of said path regulator 29 by line 28, and said path regulator 29 having an output operably connected with the adjusting unit 1a and 2a of each hydrostatic drive unit 1 and 2 by lines 21a and 23a and by valve units 21 and 23 whereby said control maintains travel of said vehicle in a straight forward direction when straight forward travel is imposed.

As indicated above, the path signal transmitters 6 may be in the form of transmitter disks with assigned sensors.

Figure 2:
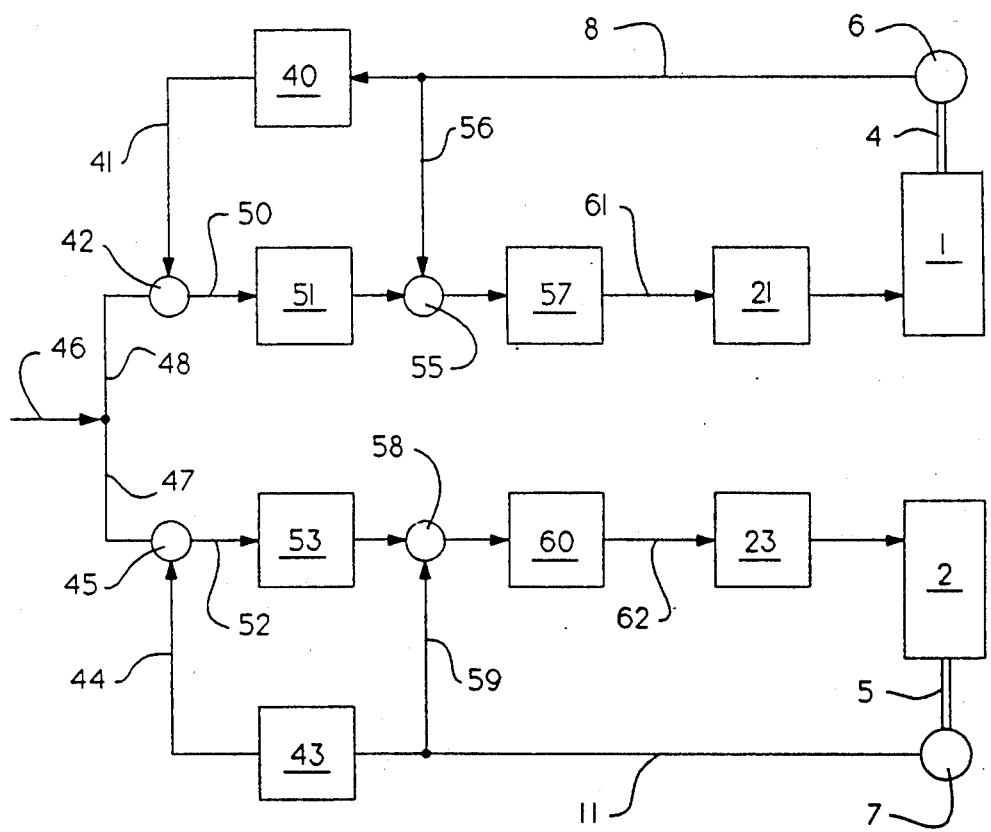
FIG. 2 shows a circuit diagram with a separate regulating unit for each drive unit.

Further, as shown in FIG. 1, the common differential path regulator 29 has an output connected to the input of the common differential speed regulator 10 by line 30. As shown in FIG. 2, the drive units 1 and 2, the output shafts 4 and 5 and the turning path impulse senders 6 and 7 and the lines 8 and 11 and the valve end stages 21 and 23 are the same as in FIG. 1. The line 8 leads to the inlet of a path computer 40, from which a line 41 leads to a summing element second 42.

Analogously, the line 11 leads to a path computer 43, from which a line 44 leads to a second summing element 45. A signal line 46, which is split into two signal lines 47 and 48, leads from a set-point specifying device to the two second summing elements 42 and 45. A control line 50 leads from the second summing element 42 to the path regulator 51 and a control line 52 leads from the second summing element 45 to the path regulator 53. The outlet of the path regulator 51 is connected to a first summing element 55, the second inlet of which is connected through a branch line 56 to the line 8 and the outlet of which is connected to the input of a speed regulator 57.

Analogously, the output of the path regulator 53 is connected to a first summing element 58, to the second input of which a line 59 branching off from the line 11 is connected and the output of which is connected to the input of a speed regulator 60.

A line 61 leads from the output of the speed regulator 57 to the valve end stage 21 and a line 62 leads from the output of the speed regulator 60 to the valve end stage 23.

Because the same path set-point is imparted to both path regulators 51 and 53, they effect a control so that the shafts 4 and 5 traverse the same turning path.

Here too, either the lines 47 and 48 can be separated from each other in order to achieve the desired cornering and be loaded with different set points, or the original signal of zero is forced on the path regulators 51 and 53 and/or the speed regulators 57 and 60 and acts directly through additional means on the valve end stages 21 and 23. Because the invention concerns the equipment for regulating straight forward travel, these additional devices are not shown.

The solutions according to FIGS. 1 and 2 are based on the same basic inventive concept, but the solution in FIG. 1 is generally preferred in practical application. A path-regulating arrangement according to FIG. 2 also makes possible a straight-forward movement that is just as good, but the cost is considerably greater than with the device according to FIG. 1, due to the fact that two regulators must be present in the solution of FIG. 2, while only one must be present in the solution of FIG. 1. In the solution of FIG. 2 the path computation extends over a much greater range than in the solution of FIG. 1 and this raises the costs in the signal processing components. The path set-point must be generated in the solution of FIG. 2 by an additional computer that can take into account the accelerations and speeds desired.

It is preferred, but not absolutely necessary for the invention in its basically simplest form, that a speed regulator be present for each drive unit. However, if one is present or one is present for each drive unit and the path regulator additionally acts on it, the regulating behavior is thus improved and can be more readily calculated. The expediency of the presence of a speed regulator is dependent on the dynamic characteristics of the regulating units of the drive unit. A direct action of the path regulator 29 on the valve end stages 21 and 23 is also possible within the framework of the invention by providing optional direct connection lines 21a and 23a (shown in chain line).

In the foregoing specification, I have set out certain preferred practices and embodiments of this invention, however, it will be understood that this invention may be otherwise embodied within the scope of the following claims.

I claim:

1. In a control for a vehicle, such as a track-laying vehicle, with differential speed steering having a pair of continuously adjustable, hydrostatic drive units, one hydrostatic drive unit on each side of the vehicle, each of said pair of hydrostatic drive units including a hydrostatic drive, an output shaft and an adjusting unit for said hydrostatic drive, a primary energy source driving each of said hydrostatic drive units, a pair of signal transmitters, the output shaft of the hydrostatic drive of one of said pair of hydrostatic drive units is connected with one of said pair of signal transmitters to detect rotational turning movement of said shaft of the hydrostatic drive of said one drive unit and the output shaft of the hydrostatic drive of another of said pair of hydrostatic drive units is connected with another of said pair of signal transmitters to detect rotational turning movement of said shaft of the hydrostatic drive of said another hydrostatic drive unit, a common speed regulator connected to an output of each of said pair of signal transmitters, a pair of valve units connected with the output of said speed regulator through a pair of summing elements, said summing elements each operably connected to a set point adjuster, one of said pair of valve units operably connected to said one of said pair of drive units thereby allowing adjustment of the speed of said one of said pair of drive units and another of said pair of valve units connected to said another of said pair of drive units thereby allowing adjustment of the speed of said another of said pair of drive units, the improvement comprising a path computer, and a path regulator, said pair of signal transmitters being path signal transmitters, said path signal transmitters each being connected to an input of said path computer, said path computer having an output connected to an input of said path regulator, and said path regulator having an output operably connected with the valve unit connected to each hydrostatic drive unit whereby said control maintains travel of said vehicle in a straight forward direction independently of various obstacles encountered on both sides of the vehicle when straight forward travel is imposed.

2. Control according to claim 1 wherein the output of the path regulator is connected to the differential speed regulator and the output of the path regulator is additionally independently connected to each of said pair of valve units.

3. Control according to claim 1, wherein the path signal transmitters detecting the turning movement are digital signal transmitters.

4. Control according to claim 1 in which the speed regulator is a differential speed regulator and wherein the output of each of said pair of path signal transmitters is connected to an input of a common differential path computer the output of which is connected to the input of a common differential path regulator, said common differential path regulator having an output thereof connected to the input of the common differential speed regulator.

5. Control according to one of claims 1, 2 or 3, characterized in that each of said pair of signal transmitters are connected to a path computer, the output of which path computer is connected through a line to a second summing element, to which a set-point signal is fed from a set-point signal line and the output of which leads to a path regulator, the output of which is connected to the first summing element, the output of which is connected with a speed regulator assigned to a drive unit.

6. Control according to claim 2 in which the speed regulator is a differential speed regulator and wherein the output of each of said pair of path signal transmitters is connected to an input of a common differential path computer the output of which is connected to the input of a common differential path regulator, said common differential path regulator having an output thereof connected to the input of the common differential speed regulator.

7. Control according to claim 3 in which the speed regulator is a differential speed regulator and wherein the output of each of said pair of path signal transmitters is connected to an input of a common differential path computer the output of which is connected to the input of a common differential path regulator, said common differential path regulator having an output thereof connected to the input of the common differential speed regulator.

8. Control according to claim 3 wherein said path signal transmitters are impulse transmitter disks with assigned sensors.

* * * * *